Aug. 14, 1956

H. E. DAY 2,758,674

PISTON ROD OILING SYSTEM

Filed June 10, 1955

INVENTOR.
Harry E. Day.
BY
Harness, Dickey & Pierce
ATTORNEYS.

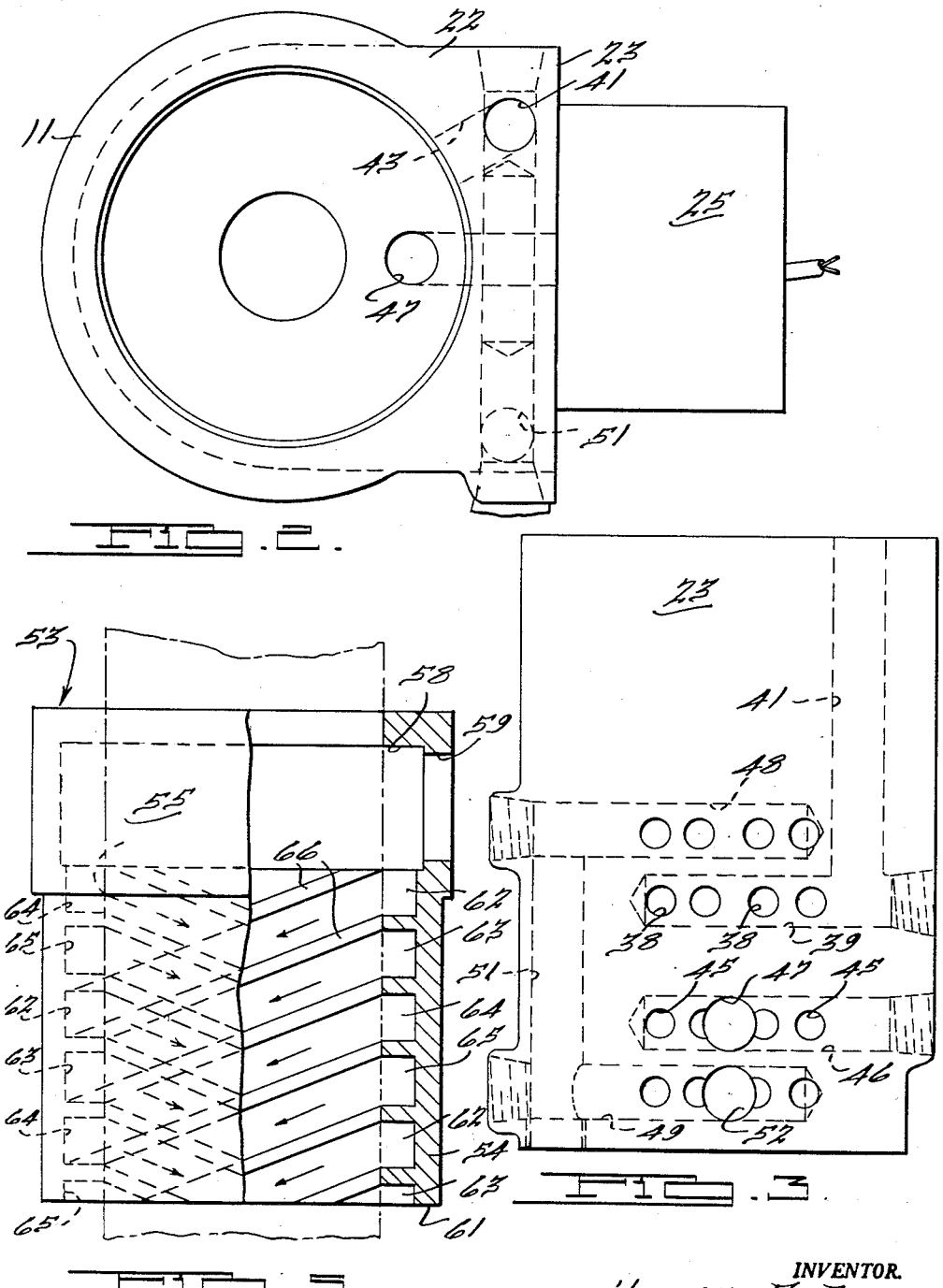

United States Patent Office 2,758,674
Patented Aug. 14, 1956

2,758,674

PISTON ROD OILING SYSTEM

Harry E. Day, Huntington Woods, Mich., assignor to Delta Welder Corporation, Detroit, Mich., a corporation of Michigan Application June 10, 1955, Serial No. 514,448

9 Claims. (Cl. 184—24)

This invention relates to fluid actuated mechanisms, and more particularly to means for lubricating the piston rods of reciprocating cylinders operated by air or other compressible media.

It is a generally accepted practice in the construction of compressed fluid systems for operating reciprocating motors such as cylinders, to provide parts which will serve to entrain an oil mist in the fluid supplied to the cylinders, for the purpose of continuous lubrication of the moving parts. This oil-laden air or other medium is passed through the valves, ports and cylinders in the usual manner and is then exhausted into the atmosphere. One of the problems presented by this type of system arises from the fact that, in installations such as double-acting cylinders, the piston-rod end of the cylinder housing is provided with a gland or packing for preventing the compressed medium from leaking out of the housing. If the air or other medium carries entrained oil particles, these particles are wiped off the piston rod as it is extended, preventing the oil from reaching the piston rod bearing. Although this action is inadvertent, it can have serious consequences, especially in applications such as air-operated welding guns which may be reciprocated at a rapid rate.

It has been known to utilize compressed air exhausted from a cylinder by blowing it through chambers built into the piston rod bearings to prevent dust or oil from being carried by the piston rods into the cylinders during operation. Examples of such devices are shown in Barrett No. 1,415,858 and Osborn No. 2,344,055. These constructions, being for an entirely different purpose, are unsuitable for use in supplying lubricant to piston rod bearings by means of the entrained oil particles in the exhaust air of the cylinder.

It is an object of the present invention to provide a novel and improved construction for the continuous lubrication of piston rods, which utilizes oil entrained in the air or other compressible medium, and which insures that full radial support is provided for the piston rod and at the same time that the entire journal surface of the rod is lubricated during the operating cycle.

It is another object to provide a novel and improved piston rod lubricating system of this type which is versatile in application to accommodate cylinders of varying strokes, is economical to fabricate, does not interfere with motor efficiency, and in which the piston rod bearing including the novel lubricating construction may also serve as a packing gland retaining member.

It is a further object to provide a piston rod oiling system of this nature, which is especially adapted for use with cylinders which operate welding guns, and in which the exhausted air is guided in such a manner as to prevent galling of the piston rod by splatter generated during welding.

Other objects, features, and advantages of the present invention will become apparent from the subsequent description, taken in conjunction with the accompanying drawings.

In the drawings:

Figure 2 is a top plan view of the cylinder and valve shown in Figure 1, the cylinder head and piston being removed, showing the connection of the ports to both chambers;

Figure 3 is a side elevational view of the cylinder taken along the line 3—3 of Figure 1 and showing the ports in the cylinder body;

Figure 5 is an enlarged elevational view partly in cross section showing a suitable construction of the piston rod bearing with the helical lubricating grooves therein.

Figures 1, 4:
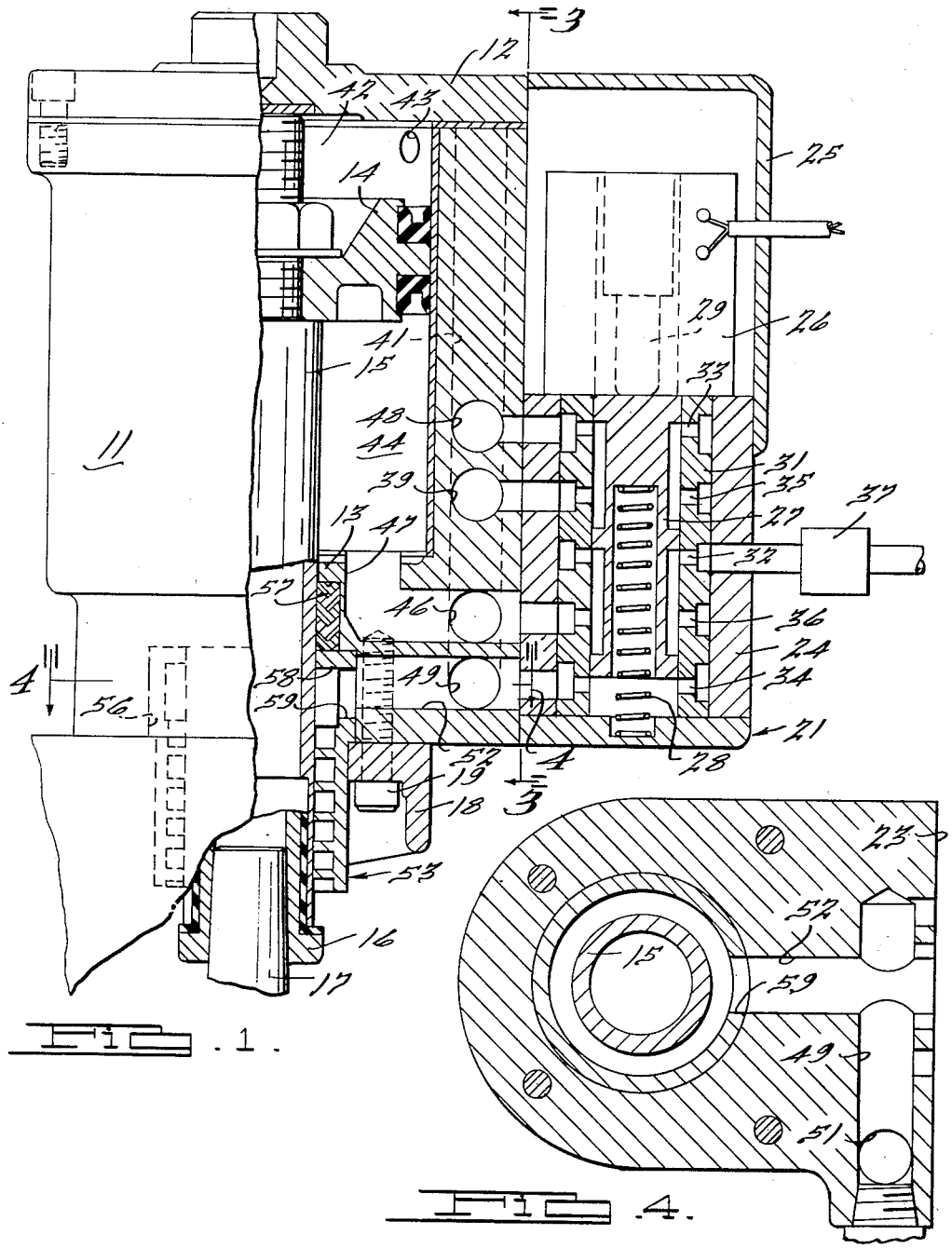
Figure 1 is an elevational view partly in cross section showing a suitable application of the invention to a double acting air operated cylinder which has a four-way valve mounted on the cylinder body.
Figure 4 is a plan view in cross section taken along the line 4—4 of Figure 1 and showing the connection of the exhaust cylinder port to the novel and improved piston rod bearing.

The invention as shown in the illustrated embodiment comprises in general a piston rod bearing and means for conducting exhaust air with entrained oil particles from both ends of the cylinder through the control valve and through the bearing. The bearing is provided with a chamber at one end thereof with means connecting this chamber to the exhaust ports of the valve so that exhaust air will flow toward the chamber instead of into the atmosphere. Leading from this chamber to the other end of the bearing are a plurality of helical grooves which face the interior surface of the bearing so that the oil-laden air will pass in a helical manner around the piston rod. The outer ends of these grooves lead to the atmosphere so that the air after having been conducted along the piston rod surface will be expelled. The portions of the bearing between adjacent turns of the grooves act as helical lands which radially support the piston rod during its operative movement.

As contrasted with devices which provide helical grooves for lubricating rotating shafts (see for example Bache Patent No. 1,184,406 and Sherwood Patent No. 1,376,043) the relative proportions of the grooves and lands in this invention, as well as the number of grooves, are preferably so chosen as to achieve optimum results with a reciprocating piston rod using the air-entrained oil particles as set forth above. The proportions are such that every portion of the piston rod surface will be exposed to the passage of air during the operating cycle. The land areas, while being correlated with the groove cross sections, are so dimensioned as to insure that the piston rod is provided with bearing surfaces extending continuously around its circumference, at least one revolution for each land, and the total land area of the bearing is such as to provide the required lateral stability. The number and cross-sectional areas of the groove are, moreover, sufficient to provide free transmission of the exhaust air, preventing the building up of any back pressure which might hinder performance of the device. The lengths of the grooves, as determined by the helix angle and groove diameter, are also so limited as to prevent any adverse or restrictive effect on cylinder operation.

Referring to the drawings, a cylinder 11 is shown having a cylinder head 12 at one end and a piston rod end 13. A piston 14 is slidably mounted within cylinder 11 and is provided with a piston rod 15 extending through the piston rod end of the cylinder. The outer end of piston rod 15 carries, in the illustrated embodiment, an adapter 16 for holding a welding point holder partially shown at 17. A mounting frame 18 is also partially shown in Figure 1, the cylinder being secured to this mounting frame by bolts 19. It will be understood of course that although a partial mounting arrangement and use are shown for the cylinder, the principles of the invention could be used equally well in other environments.

The cylinder in the illustrated embodiment is of a double acting type and is controlled by a valve assembly generally indicated at 21 which is secured to the side of cylinder 11. The cylinder is, for this purpose, provided with an enlarged portion 22, clearly visible in Figure 2, having a flat surface 23 to which the valve assembly 21 may be attached. The valve assembly comprises a valve housing 24 which contains the valve spool and ports, and a solenoid housing 25 above the valve housing for enclosing a solenoid 26.

The details of the valve construction and of the porting between the valves and double acting cylinder are not important for purposes of the invention, except insofar as they pertain to the means for guiding the exhaust air to the novel piston rod bearing construction. It may be stated however, that the valve comprises a spool 27 urged by a spring 28 into its upper position, shown in Figure 1, and movable by a plunger 29 to its lower position in response to energization of solenoid 26. Valve spool 27 is enclosed by a valve body 31, the valve body being provided with a central supply port 32, upper and lower exhaust ports 33 and 34 respectively, a cylinder head chamber port 35 between the supply port and the upper exhaust port, and a piston rod end chamber port 36 between the supply port and the lower exhaust port. The supply port is connected to a supply line having means shown schematically at 37 for entraining oil particles in the air, and the chamber ports are connected by appropriate conduits to their respective cylinder chambers. As seen in Figure 3, cylinder head port 35 is connected by a plurality of parallel passages 38 to a cross passage 39 in cylinder 11 which leads to a vertically extending passage 41. This passage is connected to cylinder head chamber 42 by a short passage 43 visible in Figure 2. Piston rod end port 36 is connected to piston rod end chamber 44 by a plurality of passages 45 leading to a cross passage 46 in cylinder 11, the latter being connected with a passage 47 visible in Figure 1 which leads to chamber 44.

Means are provided for conducting the exhaust air from both cylinder chambers to the novel bearing means of this invention. It will be noted that when valve spool 27 is in its upper position, shown in Figure 1, supply port 32 will be connected to piston rod end port 36 while cylinder head port 35 is connected to exhaust port 33. When valve spool 27 is in its lower position, supply port 32 will be connected with cylinder head port 35 while piston rod end port 36 will be connected to exhaust port 34. Exhaust ports 33 and 34 are each provided with a plurality of parallel passages, shown in Figure 3, which connect with cross passages 48 and 49 respectively in cylinder 11. These passages are connected by a vertical passage 51, seen in Figures 3 and 4, which leads to a passage 52 in the piston rod end of the cylinder. Passage 52 serves to conduct the exhaust air to the bearing, and it will be noted that exhaust air from both cylinder chambers 42 and 44 will be carried through passage 52.

The novel bearing construction is generally indicated at 53 and is best seen in Figures 1 and 5. The bearing comprises a body 54 of generally cylindrical shape, having an enlarged shoulder portion 55 at one end thereof. The exterior dimensions of shoulder portion 55 are such as to permit mounting of the bearing in a recess 56 provided in piston rod end 13, as shown in Figure 1. When mounted in this recess, bearing 53 may be held in position by mounting frame 18 as shown in Figure 1, or other means may be provided for this purpose. It will be noted from an examination of Figure 1 that recess 56 is adjacent packing 57 for the piston rod and that the end of bearing 53 serves to retain the packing in position.

The shoulder portion 55 of bearing 53 is provided with an annular chamber 58, one side of which is open to piston rod 15. Chamber 58 is provided with a port 59 which, when the bearing is in operative position, is connected with passage 52 in piston rod end 13. Leading from chamber 58 to the outer end 61 of bearing 53 are a plurality of helical grooves 62, 63, 64 and 65. Four such grooves are shown in the illustrated embodiment, although as will hereinafter appear, the number of grooves may be varied within the principles of the invention. Each groove is shown as being of rectangular cross section in the illustrated embodiment and is open toward the interior of the bearing, so that the surface of piston rod 15 will be exposed to air passing through the grooves. The grooves start at chamber 58 in 90° spaced relation and continue this staggered relationship through the length of body 54, being parallel to each other and open at the outer end 61 of the bearing. The proportions of the bearing are such that each groove makes at least one complete 360° turn from one end to the other, the grooves in the illustrated embodiment extending for approximately 450°.

The portions of the bearing between the grooves are finished to provide lands 66 for radially supporting the piston rod. It will be noted that each of these lands also extends around approximately 450°, so that each land serves as a continuously extending radial bearing surface around the entire piston rod. In the illustrated embodiment the piston rod is provided with four such continuously extending bearing surfaces. In any plane transverse to the piston rod axis, four radial bearing arcs spaced 90° apart will be provided for piston rod 15.

The relative areas of the cross sections of grooves 62—65 and lands 66 are preferably so chosen as to provide the optimum performance characteristics of the device. In particular, the arrangement is such that the required radial bearing surfaces are provided for the expected loads, while at the same time it is insured that all portions of the piston rod will at some time during the operating cycle be exposed to the exhaust air carrying entrained oil particles in the grooves. The groove cross-sectional area and length must also be such as to permit free passage of the exhaust air to the atmosphere without undue restriction. An example of how these relative proportions may be empirically arrived at is as follows:

In order to provide for proper exhaust, (1) $$A_v = A_{exh} = NDE$$

where $A_v$ = area of valve exhaust port
$A_{exh}$ = effective exhaust area of bearing
$N$ = number of grooves
$D$ = width of each groove
$E$ = depth of each groove Assume that a valve with a ⅜ inch diameter exhaust port permits a given size (say 3¼ inch bore) air cylinder to operate at an optimum speed. As a standard heavy duty cylinder, a piston rod size of 1⅜ inches diameter will be used. It is further found that a maximum bearing outside diameter of 2 inches is permissible. This leaves a wall thickness G for the bearing of 5/16 inch. For normal bronze bearing material supported properly in a surrounding casting, with a wall thickness of 5/16 inch, the maximum permissible depth of the groove or grooves is $$E_{max} = 0.25 \text{ inch.}$$

$$A_v = \pi \frac{(0.325)^2}{4} = 0.110 \text{ in.}^2$$

Substituting in Equation 1, $$ND(0.25) = 0.110$$

$$ND = \frac{0.110}{0.25} = 0.44 \text{ in.}$$

If $N=1$, $D=0.44$ or approximately 7/16 in.
If $N=2$, $D=0.220$
If $N=3$, $D=0.147$
If $N=4$, $D=0.110$ etc.

The selection of N will be influenced by several factors. The selection of the land width C is one such factor, this width being such that the entire piston rod journal surface will be exposed to the grooves during each cycle. The helix angle is another determinant, this angle being small enough to cause each land to encircle the rod at least once, but not of such size as to result in excessively long grooves. The length of the bearing, which is usually two or two-and-one-half times the diameter of the rod, is another influencing factor. With consideration of these points, the number of grooves can be properly chosen.

In operation, assume an initial condition in which the piston is at the upper end of the stroke as shown in Figure 1 and valve 27 is in its upper position shown in this figure. Upon energization of solenoid 26 valve 27 will move to its lower position. Oil-laden air will flow from supply port 32 to cylinder head chamber 42 causing piston 14 to move downwardly. At the same time, oil-laden air will flow from piston rod end chamber 44 through passages 47, 46 and 45, port 36, exhaust port 34, and passages 49 and 52 to bearing chamber 58, from where it will flow to the atmosphere through helical grooves 62—65. It should be noted at this point that while the oil-laden air was in chamber 44, oil particles had been dispersed on piston rod 15, but as the piston rod moves past packing 57 this oil is wiped off so that practically none of it will reach the piston rod bearing. However, due to the novel and improved construction of this invention, oil particles will be deposited on piston rod 15 from grooves 62—65 as the piston rod passes through bearing 53. These oil particles will serve to create an oil film between piston rod 15 and lands 66 which serve as radial bearing supports for the rod.

Since the helical grooves are interposed between the lands, all lands will be equally able to maintain an oil film. In addition, oil particles will be deposited on the piston rod as it passes through chamber 58, so that additional protection will be obtained. The air will be expelled from the ends of grooves 62—65, thus serving to exhaust piston rod chamber 44. In cases where the cylinder is used to actuate welding guns, this expelled air may also help to prevent molten particles from splattering onto the piston rod, thus reducing the possibility of galling of the parts. When the piston reaches the end of its stroke it will remain in its lower position, after which time no further air will flow through bearing 53 until the cylinder is reversed.

Upon deenergization of solenoid 26 supply air will flow to piston rod end chamber 44 and air will be exhausted from chamber 42 through passages 43, 41, 39 and 38, ports 35 and 33, and passages 48, 51, 49 and 52 to bearing chamber 58. The oil-laden air flowing through grooves 62—65 will lubricate the piston rod in the same manner as previously described with respect to the downstroke of the piston. It should be observed that during the complete cycle of operation every portion of the surface of piston rod 15 which engages lands 66 will be exposed to the oil-laden air during at least one portion of the cycle. This is because the width of grooves 66 may be made sufficiently narrow to permit all portions of the piston rod to be exposed to grooves 62—65, even in cases where the length of stroke of the piston is relatively short.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a cylinder, piston and piston rod operable by a compressible medium, a valve for controlling the flow of said medium to said cylinder, a bearing in the piston rod end of said cylinder for radially supporting said piston rod, a helical land in said bearing extending around at least 360°, a helical groove in said bearing facing said piston rod and extending around at least 360°, and means for conducting the medium exhausted by said valve through said groove, whereby oil particles carried by said medium will be deposited on said piston rod.

2. In combination, a cylinder, piston and piston rod operable by a compressible medium, packing carried in the piston rod end of said cylinder for preventing leakage of said medium, a valve for controlling the flow of said medium to and from said cylinder, a piston rod bearing, said packing being disposed between said bearing and the adjacent chamber of said cylinder, a helical land in said bearing extending around at least 360°, a helical groove in said bearing facing said piston rod, said groove extending around at least 360°, one end of said groove being open at the outer end of said bearing, and means for conducting the medium expelled by said valve to the other end of said groove, whereby oil particles entrained in said medium will be deposited on said piston rod.

3. In combination, a double acting cylinder, piston and piston rod operable by a compressible medium, a packing in the piston rod end of said cylinder for preventing leakage of said medium, a bearing for said piston rod, said packing being disposed between said bearing and the adjacent chamber of said cylinder, a plurality of helical lands in said bearing, each of said lands extending around at least 360°, a plurality of helical grooves between said lands facing said piston rod, each of said grooves extending around at least 360° and being open at the outer end of said bearing, valve means for controlling the flow of medium to and from both ends of said cylinders, and means for conducting the medium exhausted from both ends of said cylinders by said valve to the inner ends of said grooves, whereby oil particles entrained in said medium will be deposited on said piston rod.

4. The combination according to claim 3, the width of said lands being such that the entire journal surface of said piston rod will be exposed to said grooves during a complete operating cycle.

5. In combination, a double acting cylinder, piston and piston rod operable by a compressible medium, a packing in the piston rod end of said cylinder for preventing leakage of said medium, a bearing for said piston rod, said packing being disposed between said bearing and the adjacent chamber of said cylinder, a plurality of helical lands in said bearing, each of said lands extending around at least 360°, a plurality of helical grooves between said lands facing said piston rod, each of said grooves extending around at least 360° and being open at the outer end of said bearing, a chamber formed within the inner end of said bearing and connected with all of said grooves, valve means for controlling the flow of medium to and from both ends of said cylinders, and means for conducting the medium exhausted from both ends of said cylinder by said valve to said chamber, whereby oil particles entrained in said medium will be deposited on said piston rod.

6. In combination, a double acting cylinder, piston and piston rod operable by a compressible medium, a packing in the piston rod end of said cylinder for preventing leakage of said medium, a bearing for said piston rod, said packing being disposed between said bearing and the adjacent chamber of said cylinder, a plurality of helical lands in said bearing, each of said lands extending around at least 360°, a plurality of helical grooves between said lands facing said piston rod, each of said grooves extending around at least 360° and being open at the outer end of said bearing, a chamber formed within the inner end of said bearing and connected with all of said grooves, a four-way valve having a supply port, a cylinder head port, a piston rod end port and a pair of exhaust ports, and means for conducting the medium from said exhaust ports to said chamber, whereby oil particles entrained in said medium will be deposited on said piston rod.

7. The combination according to claim 6, the total cross-sectional area of said grooves being at least as large as the cross-sectional area of one of said exhaust ports.

8. In combination, a double acting cylinder, piston and piston rod operable by a compressible medium, a packing in the piston rod end of said cylinder for preventing leakage of said medium, a bearing for said piston rod, said packing being disposed between said bearing and the adjacent chamber of said cylinder, a plurality of helical lands in said bearing, each of said lands extending around at least 360°, a plurality of helical grooves between said lands facing said piston rod, each of said grooves extending around at least 360° and being open at the outer end of said bearing, valve means for controlling the flow of medium to and from both ends of said cylinders, means for supplying a medium having entrained oil particles to said valve means, and means for conducting the medium exhausted from both ends of said cylinders to the inner ends of said grooves, whereby the oil particles entrained in said medium will be deposited on said piston rod.

9. In a welding gun, a double acting cylinder, piston and piston rod operable by a compressible medium, a welding point holder adapter carried by said piston, a packing in the piston rod end of said cylinder for preventing leakage of said medium, a bearing for said piston rod adjacent said adapter, said packing being disposed between said bearing and the adjacent chamber of said cylinder, a plurality of helical lands in said bearing, each of said lands extending around at least 360°, a plurality of helical grooves between said lands facing said piston rod, each of said grooves extending around at least 360° and being open at the outer end of said bearing, valve means for controlling the flow of medium to and from both ends of said cylinders, and means for conducting the medium exhausted from both ends of said cylinders by said valve to the inner ends of said grooves, whereby oil particles entrained in said medium will be deposited on said piston rod and the medium will be discharged with an axial component of flow adjacent said adapter.

References Cited in the file of this patent

UNITED STATES PATENTS

| | | |
|---|---|---|
| 1,599,172 | Goodbrake | Sept. 7, 1926 |
| 2,728,414 | Drissner | Dec. 27, 1955 |

FOREIGN PATENTS

| | | |
|---|---|---|
| 1,085,451 | France | July 28, 1954 |